(12) United States Patent
Sugano et al.

(10) Patent No.: US 9,405,946 B2
(45) Date of Patent: Aug. 2, 2016

(54) JUDGMENT APPARATUS, JUDGMENT SYSTEM, AND JUDGMENT METHOD

(75) Inventors: Hiroyasu Sugano, Koto (JP); Shinichi Shiotsu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 994 days.

(21) Appl. No.: 13/614,271

(22) Filed: Sep. 13, 2012

(65) Prior Publication Data

US 2013/0060725 A1 Mar. 7, 2013

Related U.S. Application Data

(63) Continuation of application No. PCT/JP2010/054597, filed on Mar. 17, 2010.

(51) Int. Cl.
*G06N 5/02* (2006.01)
*G06K 7/10* (2006.01)

(52) U.S. Cl.
CPC ........ *G06K 7/10356* (2013.01); *G06K 7/10425* (2013.01); *G06K 7/10435* (2013.01)

(58) Field of Classification Search
CPC .......... G06K 7/10356; G06K 7/10425; G06K 7/10435
See application file for complete search history.

(56) References Cited

U.S. PATENT DOCUMENTS

| 2007/0057770 | A1 | 3/2007 | Tanaka et al. |
| 2009/0243809 | A1 | 10/2009 | Sugano et al. |
| 2010/0127833 | A1 | 5/2010 | Sugano et al. |

FOREIGN PATENT DOCUMENTS

| JP | 2002-92114 | 3/2002 |
| JP | 2005-135259 | 5/2005 |
| JP | 2005-275960 | 10/2005 |
| JP | 2008-142248 | 6/2008 |
| JP | 2009-259232 | 11/2009 |
| JP | 2009-276939 | 11/2009 |
| JP | 2009-284285 | 12/2009 |
| JP | 2010-123086 | 6/2010 |
| WO | 2006/011194 | 2/2006 |

OTHER PUBLICATIONS

PCT International Preliminary Report on Patentability mailed Nov. 1, 2012 in corresponding International Application No. PCT/JP2010/054597.

International Search Report issued Jun. 15, 2010 in corresponding International Patent Application No. PCT/JP2010/054597.

*Primary Examiner* — Nabil Syed
(74) *Attorney, Agent, or Firm* — Staas & Halsey LLP

(57) ABSTRACT

A judgment apparatus includes a storage configured to store first reference data representing data that a detector should output in a first area when a detection target passed the first area, and second reference data representing data that the detector should output in the first area when the detection target passed a second area being different from the first area; and a processor to perform processes of: obtaining data from the detector outputting, in a time-series manner, data according to a detection condition of the detection target passing the first area or the second area; judging a degree of similarity between data obtained by the obtaining and the first and second reference data stored in the storage; and judging whether or not the detection target passed the first area, based on the judgment result by the judging the degree of similarity.

8 Claims, 11 Drawing Sheets

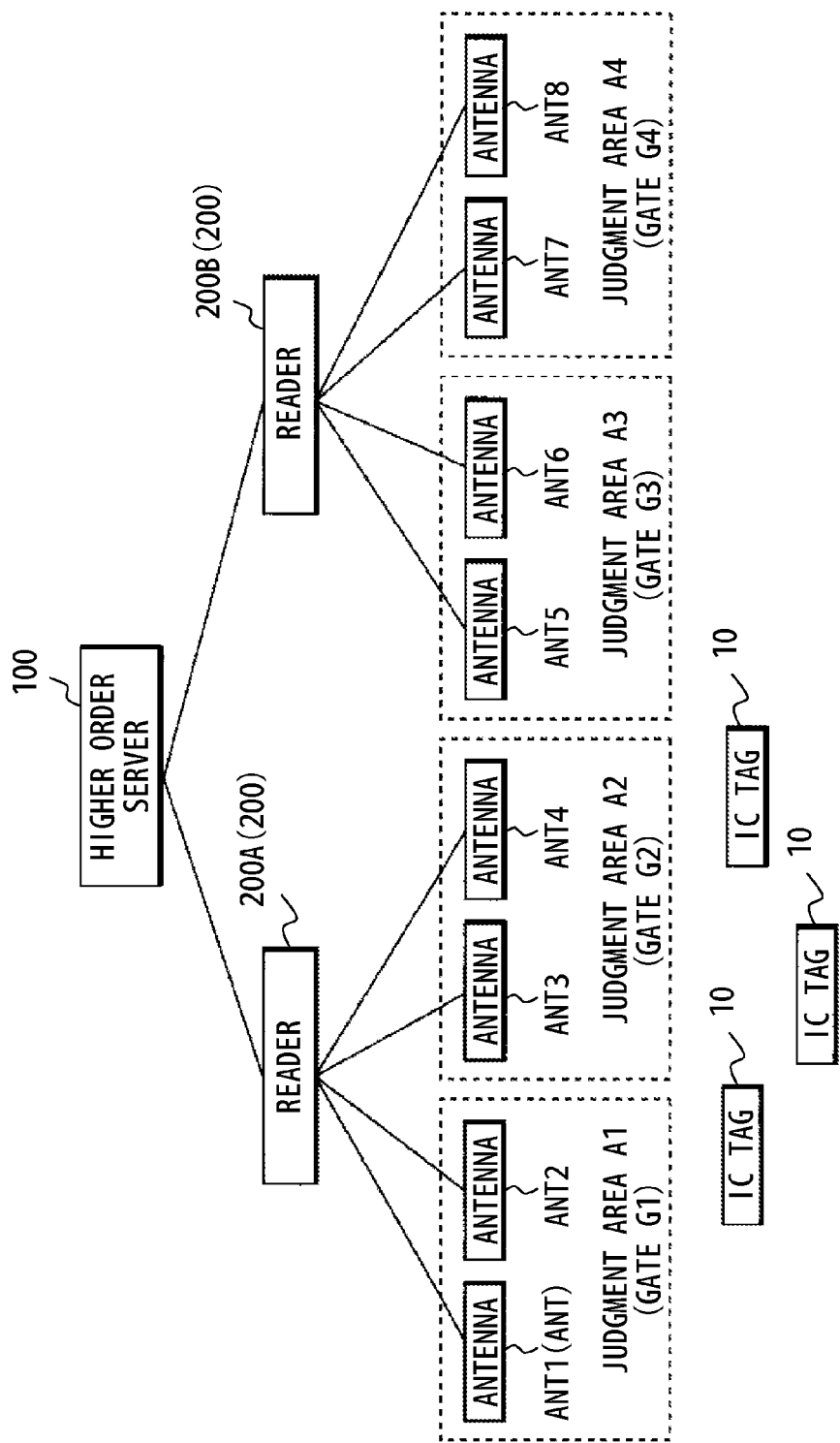
F I G. 1

FIG. 5A

JUDGMENT AREA A1 (GATE G1)

| TIME | T1 | T1+a1 | T1+a2 | T1+a3 | T1+a4 | T1+a5 | T1+a6 | T1+a7 | T1+a8 | T1+a9 | T1+a10 | T1+a11 |
|---|---|---|---|---|---|---|---|---|---|---|---|---|
| id1 | A |  |  |  | A |  |  |  | A |  |  |  |
| id2 | A |  |  |  | A |  |  |  | A |  |  |  |
| id3 |  | B |  |  |  | B |  |  |  | B |  |  |
| id4 |  | B |  |  |  | B |  |  |  | B |  |  |

FIG. 5B

JUDGMENT AREA A2 (GATE G2)

| TIME | T1 | T1+a1 | T1+a2 | T1+a3 | T1+a4 | T1+a5 | T1+a6 | T1+a7 | T1+a8 | T1+a9 | T1+a10 | T1+a11 |
|---|---|---|---|---|---|---|---|---|---|---|---|---|
| id1 |  |  | C |  |  |  | C |  |  |  |  |  |
| id2 |  |  | C |  |  |  | C |  |  |  |  |  |

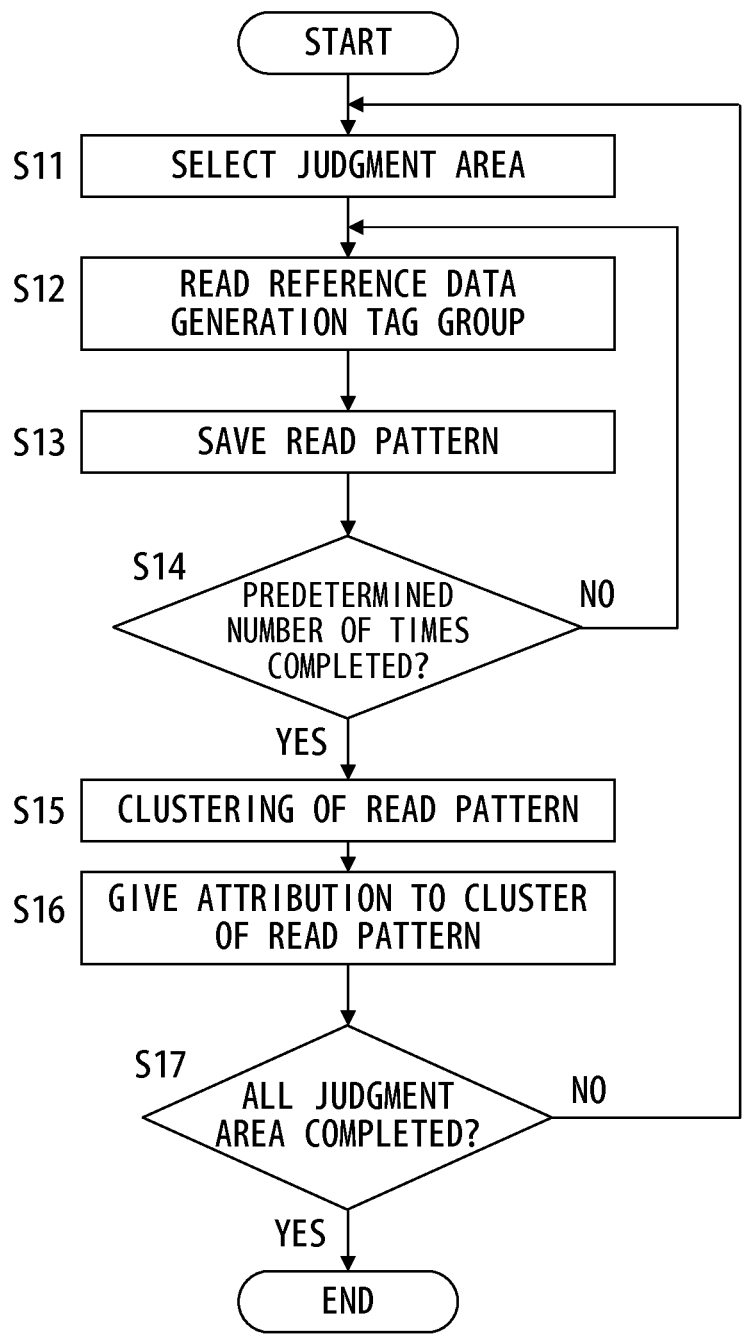
F I G. 6

FIG. 7A

JUDGMENT AREA A1

REFERENCE DATA:

| CLUSTER | ATTRIBUTION |
|---------|-------------|
| C1_1    | 1           |
| C1_2    | 1           |

TYPICAL EXAMPLE OF CLUSTER:

| C1_1 (TYPICAL EXAMPLE) |   | A | A | A |
|------------------------|---|---|---|---|
| C1_2 (TYPICAL EXAMPLE) | B | B | B |   |

FIG. 7B

JUDGMENT AREA A2

REFERENCE DATA:

| CLUSTER | ATTRIBUTION |
|---------|-------------|
| C2_1    | 1           |
| C2_2    | 0           |

TYPICAL EXAMPLE OF CLUSTER:

| C2_1 (TYPICAL EXAMPLE) | C | C | C | C | C |   |   |   |
|------------------------|---|---|---|---|---|---|---|---|
| C2_2 (TYPICAL EXAMPLE) | C | C |   |   | C | C | C | C |

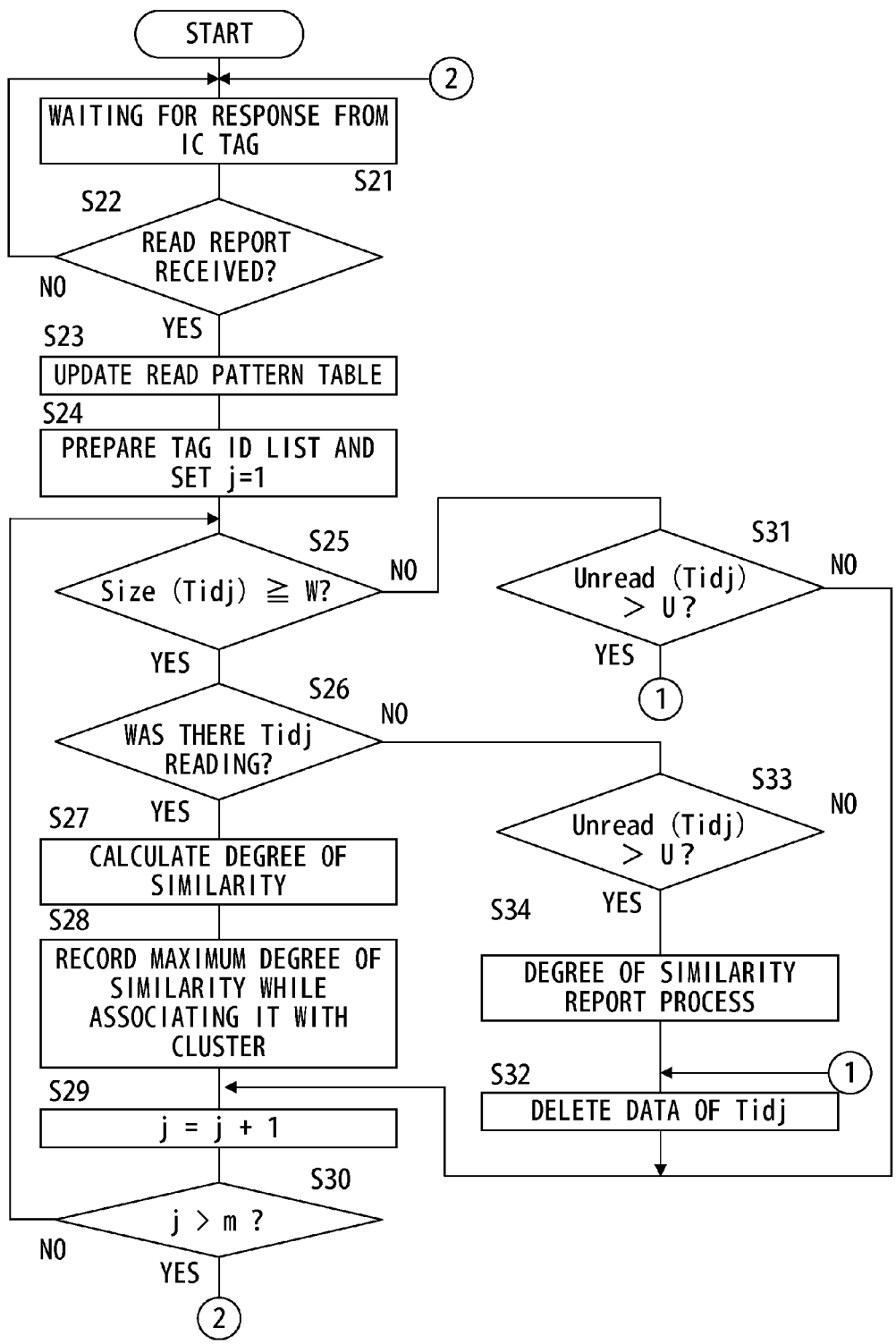
F I G. 8

F I G. 9A

JUDGMENT AREA A1

DEGREE OF SIMILARITY TABLE

| TAG ID \ CLUSTER | C1_1 | C1_2 |
|---|---|---|
| Tid1 | 0.54 | -0.20 |
| Tid2 | 0.38 | 0.11 |
| Tid3 | -0.41 | 0.23 |
| Tid4 | 0.05 | 0.26 |
| ⋮ | | |

F I G. 9B

JUDGMENT AREA A2

DEGREE OF SIMILARITY TABLE

| TAG ID \ CLUSTER | C2_1 | C2_2 |
|---|---|---|
| Tid1′ | 0.15 | 0.47 |
| Tid2′ | 0.52 | -0.31 |
| Tid3′ | 0.49 | -0.08 |
| Tid4′ | -0.27 | 0.36 |
| ⋮ | | |

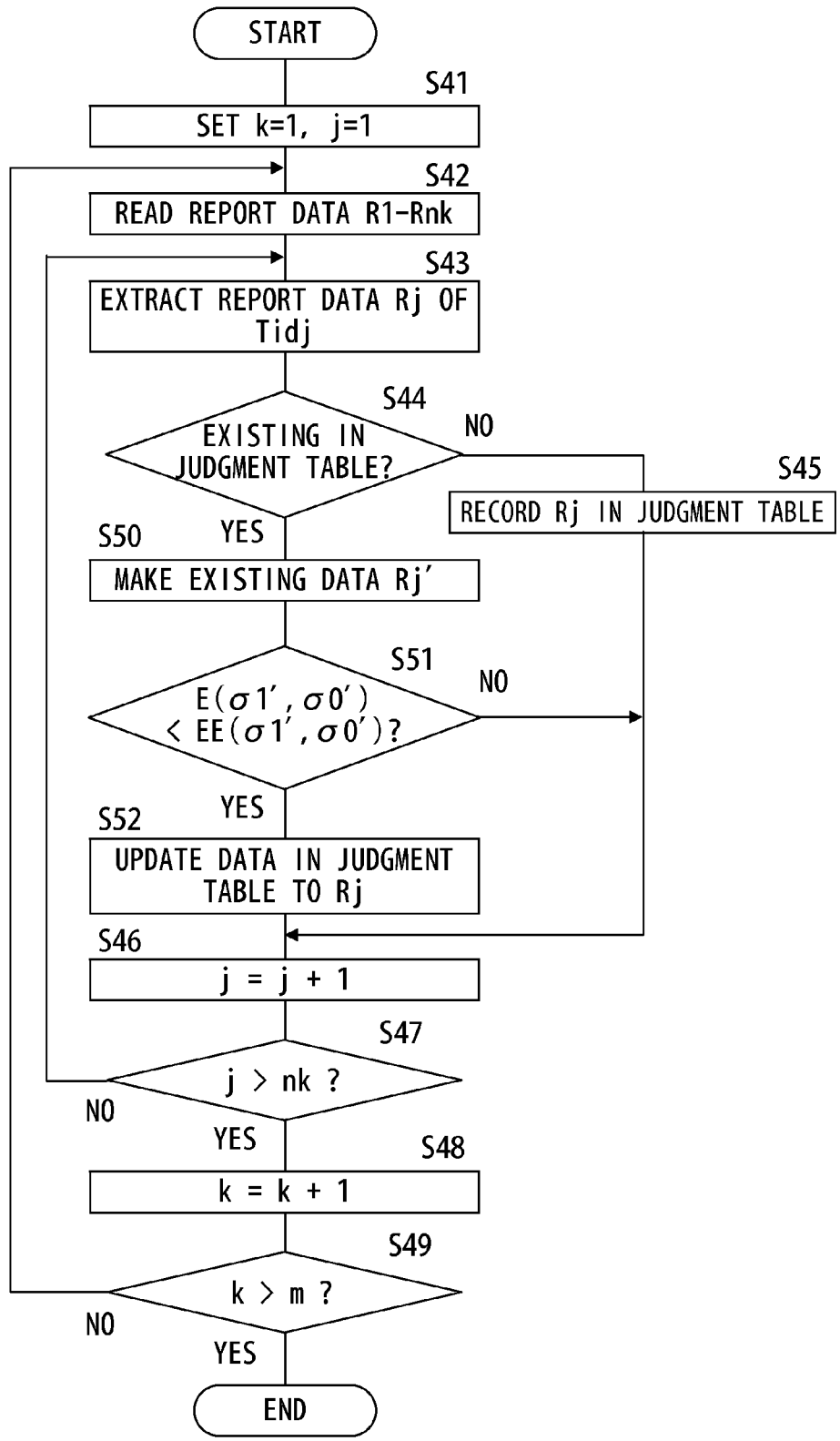
F I G. 10

US 9,405,946 B2

JUDGMENT APPARATUS, JUDGMENT SYSTEM, AND JUDGMENT METHOD

CROSS REFERENCE TO RELATED APPLICATION

This application is a continuation of International Application PCT/JP2010/054597 filed on Mar. 17, 2010 and designated the U.S., the entire contents of which are incorporated herein by reference.

FIELD

The embodiments discussed herein are related to a judgment apparatus, judgment system, judgment method and computer program to judge the passing area of an IC tag.

BACKGROUND

In recent years, the RFID (Radio Frequency IDentification) has been used in various fields. The RFID is a technique to read out data including unique identification information stored in an IC (Integrated Circuit) tag by radio communication and to write data into the IC tag.

The RFID includes the active type in which the power for operation is supplied internally, and the passive type that has no battery inside and operates with the power supplied by the high frequency wave transmitted from a reader apparatus.

For the passive type that has no battery, the use in various fields including the logistics field has been expected, since it may be offered at a relatively low price as compared to the active type.

In addition, when the UHF band (860-960 MHz) is used as the frequency band for the RFID, even with the passive type, the reading area is relatively broader compared with other frequency bands, and a plurality of tags may be read at one time.

Therefore, in the logistics field for example, it becomes possible to read a plurality of tags attached to a number of items at one time, to inspect the items.

When the reading area is broadened using the UHF band, information of a tag that is not intended by the administrator may be read. For example, in inspecting arriving items and shipped items in a warehouse and the like, for a tag of an item placed on a position that is usually too far from the inspection gate to read, with a forklift and the like passing nearby the item, the information of the tag may be read due to radio wave reflected on the forklift. In addition, when a plurality of gates are placed, there is a possibility that an erroneous judgment is made, as the tag of an item entering an adjacent gate may be read.

In such a case, the unwanted tag may be excluded by performing filtering based on the ID stored in the tag. As an example, in a case where the IDs are hierarchized by category of the item (for example, the type representing whether it is a pallet or an individual item), by knowing category data representing the category of the item in advance, the tag ID indicating a pellet tag may be excluded.

In addition, when the unintended tag reading is due to the reflection of radio wave, a method has been known in which a plurality of detections are performed regularly for the tag attached to an item, and when the ID of the tag could not be detected successively for predetermined times, it is excluded as read accidentally due to reflection (for example, see Japanese Laid-open Patent Publication No.: 2005-275960).

However, when the target tag and the unwanted tag is an item of the same category, the sorting by category data included in the hierarchized ID is impossible.

Other than that, in order to exclude the unintended tag reading, there is a method in which the reading area is isolated physically by a radio wave absorption plate and the like, this has a problem that the man hour for the work at the installation site increases significantly.

Furthermore, there is a method in which a tag outside the original reading area is found and regarded as an unwanted tag by using an antenna such as the phased array type with which its directivity may be changed, but this newly causes a problem that the reading apparatus becomes expensive.

In order to solve these problems, the inventors of the present application have disclosed, in the prior applications, a method in a reader (reading apparatus) that repeatedly read data in a contactless manner from a tag in a communicable area and a control system, the result of clustering by degree of similarity given to time series data from time series data of reading results collected in advance is held as reference data, and sorting into necessary data or unwanted data is performed by calculating the degree of similarity of read data and the reference data (see Japanese Patent Application No. 2008-298770 and Japanese Patent Application No. 2009-999924).

SUMMARY

According to an aspect of the embodiment, a judgment apparatus includes a storage configured to store first reference data representing data that a detector should output in a first area when a detection target passed the first area, and second reference data representing data that the detector should output in the first area when the detection target passed a second area being different from the first area; and a processor to perform processes of: obtaining data from the detector outputting, in a time-series manner, data according to a detection condition of the detection target passing the first area or the second area; judging a degree of similarity between data obtained by the obtaining the first and second reference data stored in the storage; and judging whether or not the detection target passed the first area, based on the judgment result by the judging the degree of similarity.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a schematic diagram presenting the overall configuration of the IC tag reading system according to embodiment 1.

FIGS. 5A and 5B are a schematic diagram illustrating an example of a read pattern.

FIG. 6 is a flowchart presenting a generation procedure of reference data.

FIGS. 7A and 7B are a schematic diagram presenting an example of reference data.

FIG. 8 is a flowchart presenting a process procedure of a degree of similarity judgment process during operation.

FIGS. 9A and 9B are a schematic diagram illustrating an example of a degree of similarity table.

FIG. 10 is a flowchart illustrating a process procedure of a judgment area determination process.

DESCRIPTION OF EMBODIMENTS

Figure 2:
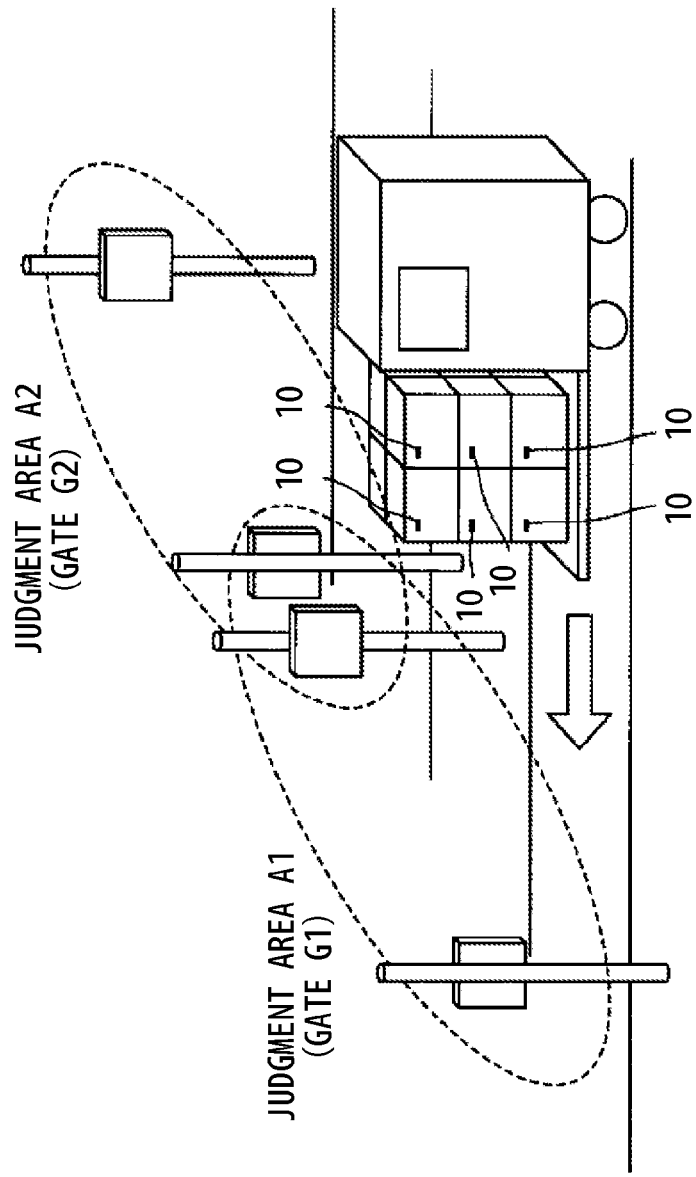
FIG. 2 is a schematic diagram illustrating an specific example of the judgment area.

For example, the prior applications assume the processing form by a single reader, or the processing form in which a single host computer controls a plurality of readers.

This leads to a case in which read data may not be judged with a good accuracy in the processing form in which a plurality of autonomic operation type readers that are expected to be broadly used operate simultaneously.

For example, when determining whether or not read data is necessary or unwanted is performed in each of the readers that autonomously operate, it becomes impossible to handle when the readers make contradicting judgments for the same tag ID.

This is because, at the site such as a shipping center where a plurality of shipping lanes for shipping goods are placed next to each other, when the reading gate is provided for each shipping lane, about a tag for which its passage has been detected in a reading gate, an adjacent gate may also detect it as having been passed the adjacent gate.

More specifically, this is a case in which when a gate 1 and a gate 2 placed at different shipping lanes are adjacent, a reader 1 provided at the gate 1 judges that a certain tag ID has passed the gate 1, and at the same time, a reader 2 provided at the gate 2 also judges that the same tag ID passed the gate 2 at the same timing. That is, a contradicting judgment result that the same tag ID is read at a plurality of different gates simultaneously is obtained.

In addition, even if the judgment is made after read data read by each reader are aggregated in a higher order server, in the conventional method, since it is assumed that all the readers operate in the same manner as the time the reference data are collected, when some gates operate in the different way or stops, the judgment accuracy deteriorates if the aggregation of reading results is assumed.

Hereinafter, embodiment in which the judgment system is applied to an IC tag reading system are explained specifically using drawings.

Embodiment 1

FIG. 1 is a schematic diagram presenting the overall configuration of an IC tag reading system according to embodiment 1. The IC tag reading system according to embodiment 1 includes a higher order server 100, reader 200A, 200B, antenna ANT1-ANT8, IC tag 10.

Meanwhile, in the following explanation, when there is no need to explain the readers 200A and 200B with distinction from each other, they are described as the reader 200, and when there is no need to explain the antenna ANT1-ANT8 with distinction from each other, they are described as the antenna ANT.

The higher order server 100 aggregates information of the IC tag 10 read by the reader 200 and passes it to an operation application.

The higher order server 100 and the reader 200 are connected by wired or wireless LAN, WAN or other networks. A plurality of antennas ANT are connected to the reader 200, and transmission/reception of data with the IC tag 10 is performed by performing transmission/reception of a command and a response by wireless communication via the antenna ANT.

The transmission/reception of the command and the response is performed according to a predetermined protocol. For example, as the standard protocol for the UHF band IC tag using the communication frequency band 860-960 MHz, a standard such as the ISO18000-6 type C is used.

The reader 200 operates autonomously, and according to predetermined conditions, reads the IC tag 10 repeatedly. When reading the IC tag 10, the reader 200 communicates with one or a plurality of IC tags 10 in the area in which radio wave reaches at a certain radio wave strength from the antenna ANT to which the reader 200 is connected. The reader 200 returns data received from the IC tag 10 to the higher order server 100 at a timing given in advance.

The higher order server 100 processes data transmitted from the reader 200 according to a program given in advance.

The IC tag 10 includes a memory storing unique identification data (Identifier, hereinafter referred to as an ID), the IC tip performing a predetermined process, an antenna enabling wireless communication and the like. The IC tag 10 is attached to the item to be identified by the ID or held by a human. In addition, the IC tag 10 may store data related to the attached object (for example, the category, manufactured date and the like of the item).

The IC tag 10 explained in this embodiment uses the radio wave system using the communication frequency band of the UHF band, and generates current by receiving the high frequency wave transmitted from the antenna ANT of reader 200. The generated current is supplied to each part of the IC tag 10 as an adjusted supply voltage after rectification, which enables the IC tag 10 to operate.

Meanwhile, the operation described above is for the passive type IC tag that has no battery inside, but the active type IC tag that has a battery inside may also be used.

In the present embodiment, as illustrated in FIG. 1, a plurality of antennas ANT connected to the reader 200 cover Logical Add (OR) areas of the reading areas of the antennas ANT as judgment areas A1-A4. In the example illustrated in FIG. 1, the way the judgment area A1 is formed by two antennas ANT1, ANT2 as the reading area of the IC tag 10 that passes a gate G1 is presented. The same applies to the judgment areas A2-A4 for reading the IC tag 10 that passes other gates G2-G4.

Thus, the present embodiment is configured so that the two antennas ANT cover one judgment area, but the configuration may also be made so that one antenna ANT covers one judgment area, and three or more antennas cover one judgment area.

In addition, the present embodiment is configured so that two readers 200A-200B manages eight antennas ANT1-ANT8, but the number of antennas and the number of readers may be set as needed.

FIG. 2 is a schematic diagram illustrating a specific example of the judgment areas A1, A2. The judgment area A1 is the gate G1 that a forklift or a cart that carries the item with the IC tag 10 attached to it passes. The same applies to the judgment area A2.

For example in a shipping center and the like, in order to load items on trucks with different delivery destinations, a plurality of gates G1, G2 are placed, and the antennas ANT1-ANT4 are placed to read the IC tag 10 at each of the gates G1, G2. The identification information of the gates G1, G2 is managed by the reader 200A and the higher order server 100 as the judgment areas A1, A2.

Meanwhile, the same applies to the judgment areas A3, A4 that are not illustrated in FIG. 2.

Figure 3:
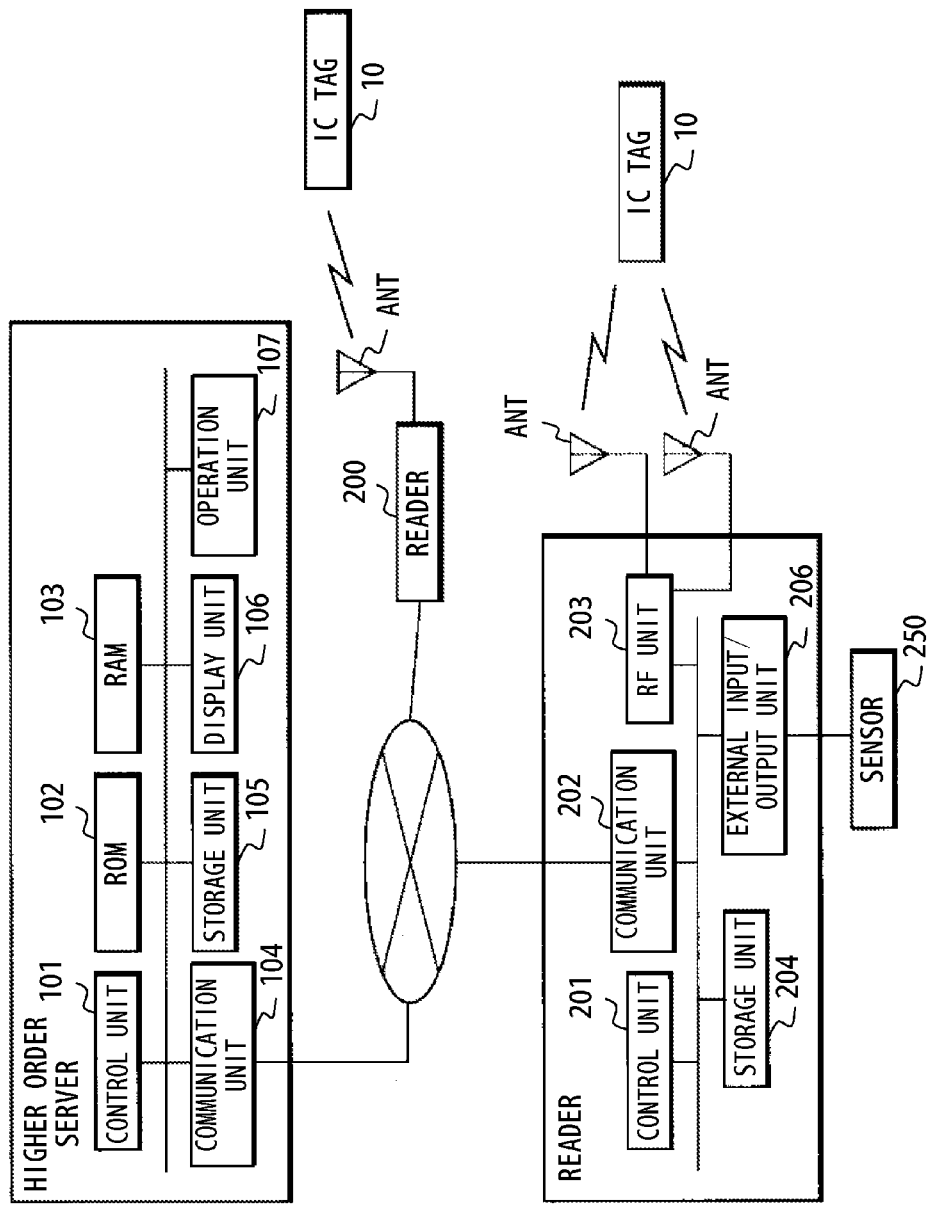
FIG. 3 is a block diagram illustrating the hardware configuration of a higher order server and a reader.

FIG. 3 is a block diagram illustrating the hardware configuration of the higher order server 100 and the reader 200. The higher order server 100 includes a ROM (Read Only Memory) 102, a RAM (Random Access Memory) 103, a communication unit 104, a storage unit 105, a display unit 106, an operation unit 107, and they are connected via a bus.

The control unit 101 includes a processor, a CPU (Central Processing Unit) or a MPU (Micro Processing Unit) and the like. When the MPU is provided, the ROM 102 and the RAM 103 may be embedded into the control unit 101.

The control unit 101 read, onto the RAM 103, and execute, the computer program stored in the ROM 102 or the storage unit 105 according to a predetermined timing, and also, controls the operation of each hardware unit described above.

The ROM 102 stores a computer program required for realizing the judgment method of some embodiments and a computer program required for making each hardware unit described above operate, in advance.

The RAM 103 is a DRAM (Dynamic RAM), SRAM (Static RAM), a flash memory and the like for example, and temporarily stores various data generated when the control unit 101 executes the computer program (for example, the calculation result, read data, various parameters).

The communication unit 104 performs data communication with the reader 200 via a wired or wireless network, and receives data of the IC tag 10 that the reader 200 read.

The operation unit 107 includes an input interface that is required for the operator to operate the higher order server 100. The display unit 106 is a liquid crystal display for example, and displays the operation status of the higher order server 100, information input via the operation unit 107, information that should be sent to the operator and the like, according to the instruction from the control unit 101.

The display unit 106 and the operation unit 107 provides an interface with the operator. The configuration may also be made so that the higher order server 100 performs operation input from another device, output to another device via a network, and the display unit 106 and the operation unit 107 do not have to be necessarily provided.

The storage unit 105 is a nonvolatile storage unit such as a hard disc or a flash memory. The storage unit 105 stores reference data collected from the reader 200 and the like. The present embodiment is configured so that the computer program required for realizing the judgment method of some embodiments, the computer program required for operating each hardware unit area stored in the ROM 102, but the configuration may also be made so that the storage unit 105 stores these computer programs.

Next, the hardware configuration of the reader 200 is explained. The reader 200 includes a control unit 201, a communication unit 202, an RF unit 203, a storage unit 204, an external input/output unit 206, and they are connected to each other via a bus.

The antenna ANT obtaining data from the IC tag 10 is connected to the RF unit 203. In the present embodiment, the antennas ANT1-ANT4 are connected to the RF unit 203 of the reader 200A, and the antennas ANT5-ANT8 are connected to the RF unit 203 of the reader 200B.

The control unit 201 of the reader 200 performs wireless communication with the IC tag 10 via the RF unit 203 and the antenna ANT according to the operation procedure stored in the storage unit 204 in advance. The storage unit 204 is a volatile storage apparatus such as a hard disc or a flash memory.

The internal input/output unit 206 provides an interface to receive input from a sensor 250 such as an optical sensor, touch sensor and the like and output a signal to a control unit of an external device such as a PLC (Programmable Logic Controller). With the sensor 250 detecting the passage of an item or a human, the reader 200 is able to recognize the passage of the item and the human via the external input/output unit 206, and to control start/end of the tag reading process.

The reader 200 performs data transmission/reception with the IC tag 10 according to the following procedures. The reader 200 first searches the IC tag 10 existing in the readable area of the antenna ANT (inventory). That is, the reader 200 outputs an wireless signal representing a search command from the antenna ANT. The IC tag 10 that received the search command that the reader 200 transmitted transmits its own identification data (tag ID) to the reader 200 as a response to the search command, after a voltage is supplied to each unit and becomes operable.

Accordingly, the reader 200 may identify the tag ID of the IC tag 10, and the data transmission/reception between the reader 200 and the IC tag 10 becomes available.

When the reader 200 transmits a search command, when a plurality of IC tags 10, 10, . . . , 10 exist in the communicable range of the antenna ANT, the plurality of IC tags 10, 10, . . . , 10 send the response to the search command simultaneously, and a condition where the responses interfere with each other and therefore the reader 200 cannot receive the response (collision) may occur.

In order to prevent this, a collision prevention function is implemented in the reader 200 and the IC tag 10. When a collision occurs, according to the collision prevention protocol defined between the reader 200 and the IC tag 10, a temporary response control from the IC tag 10 and the like is performed, and, identification of the IC tag 10 is performed by means of the reception, by the reader 200, of a response including a tag ID from the last one remaining IC tag 10. When there remains an IC tag 10 without response, the similar procedure of collision prevention is taken according to the commands sequentially transmitted from the reader 200, and identification of the tag ID is performed one by one. As a result, the reader 200 may obtain the tag ID of all the IC tag 10 that is capable of response.

When the IC tag 10 has data of the item and the like other than the tag ID, reading/writing of data may be performed by further transmitting/receiving a data reading command and a data writing command between the reader 200 and the IC tag 10.

The reader 200 repeatedly transmit a search command autonomously according to conditions specified in advance. The IC tag 10 transmits stored data each time when it receives a search command. Therefore, the reader 200 receives, every time it transmits a search command, the IC tag 10 that exists in the readable area of the antenna ANT responses every time, and if there is no problem in the radio wave environment, receives data corresponding the number of times each IC tag 10 responses.

The reader 200 and the higher order server 100 performs an unwanted tag reading filtering process using the time series pattern received repeatedly for each tag ID.

Figure 4:
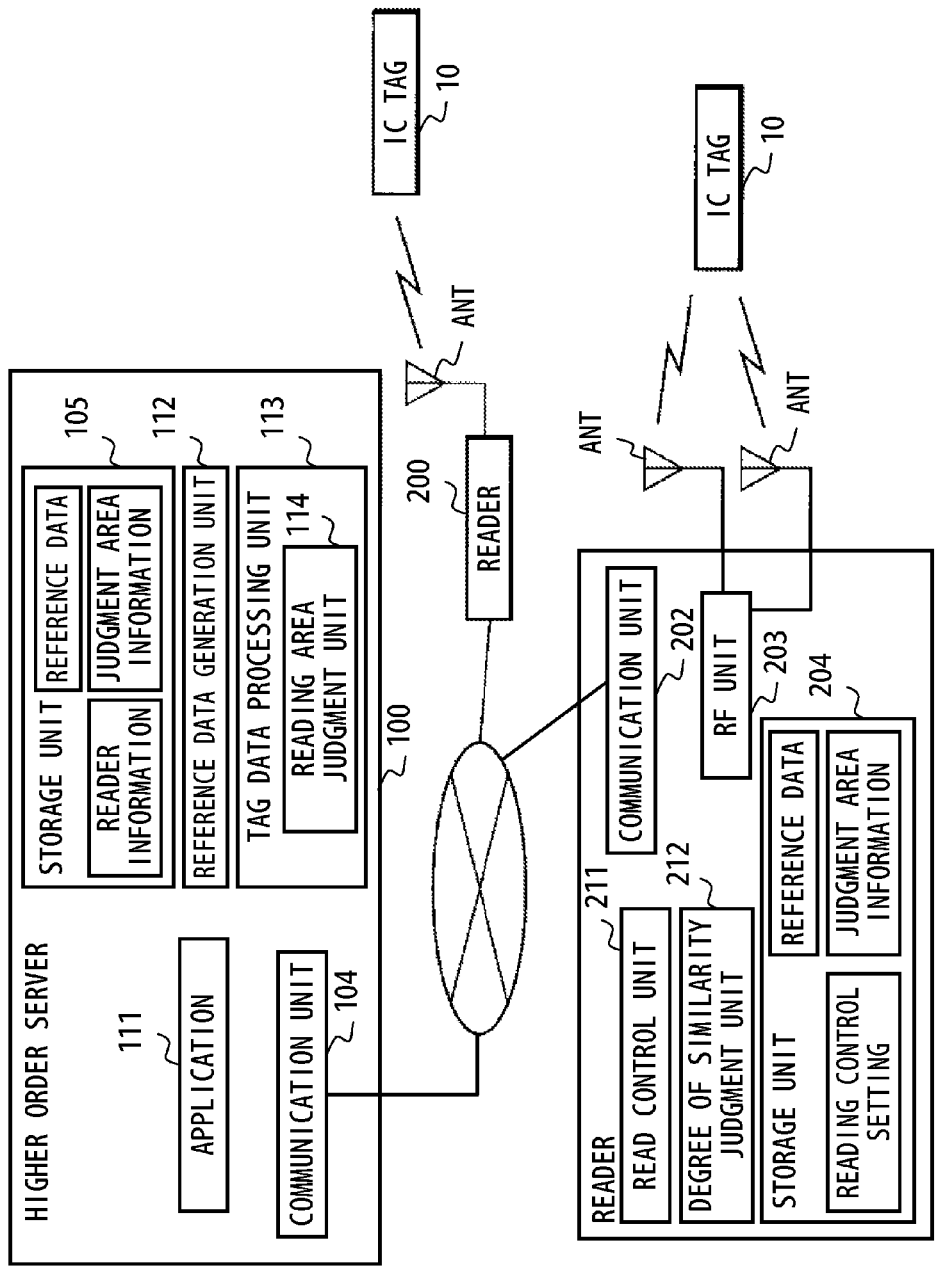
FIG. 4 is a block diagram illustrating the functional configuration of the higher order server and the reader.

FIG. 4 is a block diagram illustrating the functional configuration of the higher order server 100 and the reader 200. An application 111 stored in the higher order server 100 for example performs process according to various operations such as manufacturing, logistics, inventory management and the like, using information of the tag that the reader 200 reads. The reference data generation unit 112 generates reference data in the filtering from information such as an expected pattern being an idea read pattern that the reader 200 collects in advance. The generated reference data is stored in the storage unit 105. Details of the reference data are described later.

In addition, the storage unit 105 stores information of the reader 200 from which the higher order server 100 may receive tag data (reader information) and information of the judgment area that each reader 200 covers (judgment area information).

A tag data processing unit 113 includes a reading area judgment unit 114 that determines the final reading area from the judgment area based on information such as the calculation result of the degree of similarity between data of the tag ID and the like reported from the reader 200 and the reference data. Here, the final reading area refers to the gate identification information with a high possibility (probability) that the detected IC tag 10 passed among the gates G1-G4. The judgment area refers to the gate identification information of the gate at which the antenna ANT of the reader 200 connected communicably to the higher order server 100 via a network is provided. Information about the reader 200 connected communicably to the higher order server 100 via a network may be known by referring to the reader information stored in the storage unit 105 of the higher order server 100.

The reader 200 operates autonomously according to the reading control setting set prior to the operation and reads the IC tag 10.

The reading control setting is stored in the storage unit 204 of the reader 200 and describes one or more antennas ANT used and their order, the number and time to transmit the search command repeatedly from each of the antennas ANT, and when reading/writing of data other than the ID to the read tag ID is to be performed, the specification of the reading/writing command, and the like.

A reading control unit 211 loads the content of the reading control setting form the storage unit 204, and according to the described control procedure, controls the RF unit 203 corresponding to each antenna ANT to transmit the search (inventory) command of the IC tag 10, and reads the response from the IC tag 10.

The read time series data of the tag ID is compared with the reference data stored in the storage unit 204 as the time series data collected in advance for each tag ID, and the degree of similarity with the optimal cluster data is calculated. Meanwhile, the process procedure of the degree of similarity judgment is described later.

Next, the time series data that the reader 200 obtains by reading the tag ID repeatedly is explained.

The reader 200 issues the search (inventory) command repeatedly using one or a plurality of antennas ANT according to the reading control setting stored in the storage unit 204. At this time, the response result of the search command is held in the storage unit 204 in the order of time series collectively for each of the read tag IDs and each of the judgment areas. The time series data held in the storage unit 204 is referred to as the read pattern.

FIGS. 5A and 5B are a schematic diagram presenting an example of the read pattern. FIG. 5A presents an example of the read pattern in the judgment area A1 (gate G1), and FIG. 5B presents an example of the read pattern in the judgment area A2 (gate G2). As described above, the two antennas ANT1 and ANT2 cover the judgment area A1 in the gate G1 and the two antennas ANT3 and ANT4 cover the judgment area A2.

In each of the read patterns, T1, T1+a1, . . . , T1+a11 in the row direction (horizontal axis) represent the series of time, and indicates the time at which the reader 200A issues the search command. In the present embodiment, the reader 200A is supposed to issue a search command repeatedly while switching the antenna to issue the search command in order of the antenna ANT1, ANT2, ANT3, ANT4 at each time. The search command is not necessarily issued at a regular time interval, and issued at a timing as needed controlled by the control unit 201 of the reader 200. Meanwhile, a1, a2, . . . , a11 are time of about several dozen msec.

Meanwhile, the left end of the column direction (vertical axis) of the read pattern describes the tag ID of the read IC tag 10. The example presented in FIGS. 5A and 5B illustrates that the IC tag 10 having the tag IDs id1-id4 were read.

The symbols A-C presented in each field of the read pattern is the symbols representing the antenna ANT1, ANT2, ANT3, respectively. Meanwhile, while the symbol representing the antenna ANT4 is D, the example presented in FIGS. 5A and 5B illustrates that there was no reading by the antenna ANT4. In addition, a blank represents that there was no reading of the IC tag 10.

The read pattern presented in FIG. 5A illustrates a pattern in which, as a result of issuing the search command by the antenna ANT1 at the time T1, T1+a4, T1+a8, the IC tag 10 having the tag ID id1 and the IC tag 10 having the tag ID id2 were read, and as a result of issuing the search command by the antenna ANT2 at the time T1+a1, T1+a5, T1+a9, the IC tag 10 having the tag ID id3 and the IC tag 10 having the tag ID id4 were read. Meanwhile, the read pattern presented in FIG. 5B illustrates a pattern in which, as a result of issuing the search command by the antenna ANT3 at the time T1+a2, T1+a6, the IC tag 10 having the tag ID id1 and the IC tag 10 having the tag ID id2 were read.

In order to display each row of the read pattern as a character string, the blank may be described with an underscore "_", and the row of id1 in the judgment area A1 may be described as "A____A____A____".

In addition, when the antenna output is changed with two stages, a large output may be described with an upper case as "A", and a small output may be described with a lower case as "a".

In the example in FIGS. 5A and 5B, the series of time is put in the row direction (horizontal axis), but the number of issue of the search command may be put on the horizontal axis instead. Hereinafter, in order to avoid complexity, it is assumed that the number of issue of the search command is put on the horizontal axis.

In the present embodiment, the read pattern obtained during operation for each tag is compared with the reference data collected and stored in advance and their degree of similarity is obtained, to determine the most probable judgment area.

Next, the reference data is explained. When generating the reference data, each reader 200 is operated in the same manner as the time of operation, and data collection is performed while placing or moving the item which the IC tag 10 is attached in the same loading form as the time of operation. A plurality of readings (for example, five to ten) is performed for each judgment area, and the higher order server 100 generates the reference data based on the collected data.

FIG. 6 is a flowchart presenting the generation procedure of the reference data. First, a reference data generation tag group is prepared in advance. Specifically, by loading a plurality of items to which the tag is attached in the same manner as at the time of operation, the reference data generation tag group is formed, and moved or placed by the same transportation means as at the time of operation. As the transportation means, a forklift, a cart, a conveyor and the like may be used.

The reference data generation unit 112 of the higher order server 100 first selects one judgment area from the judgment area information stored in the storage unit 105 (step S11). For example, when there are judgment areas A1-Am corresponding to m gates from G1-Gm, the judgment area A1 corresponding to the gate G1 is selected as one of them.

In the next step, the higher order server 100 makes all the readers 200 used at the time of normal operation operate, and make them read the reference data generation tag group in the same conditions (the moving speed and the like) as the time of normal operation (step S12). Meanwhile, the gate through which the reference data generation tag group passes is the gate corresponding the judgment area selected in step S11.

At this time, the read pattern of the tag ID read by the reader 200 is reported to the higher order server 100. The higher order server 100 temporarily stores the read pattern reported from the reader 200 for each judgment area in the storage unit (step S13). That is, when the reference data generation tag group passes the gate, the read pattern of the tag ID indicating whether or not each IC tag 10 was detected by the plurality of antennas ANT placed for the gates are sorted by each gate and saved.

The process to let the reference data generation tag group pass the gate corresponding to the selected judgment area and to let it read is repeated for a predetermined times. Then, every time it is repeated, the read pattern reported from the reader 200 is saved for each tag ID and each judgment point. The higher order server 100 determines whether or not the reading process for a predetermined times has completed after the step S13 (step S14), and when the reading process for a predetermines times has not been completed (S14:NO), the process returns to step S12.

When the reading process for a predetermines times has been completed (S14:YES), the clustering of read patterns for each judgment area is performed (step S15). For the clustering, various clustering methods that are already known may be used. For example, as the calculation method of the degree of similarity to be the reference, the following method may be used. First, the respective character strings of two read patterns are compared, and when both are "_" or one of them is "_", 0 is added, and when they are the same character other than "_" (for example, both are "A", both are "B"), 1 is added, when they are different characters, −1 (minus 1) is added to obtain an integer value. A tentative degree of similarity is obtained by dividing the integer value by the overall number of readings. Then, the calculation of the degree of similarity is performed while shifting the read pattern, and the maximum degree of similarity is obtained as the degree of similarity between the two read patterns.

The clustering is performed by calculating the degree of similarity between the respective read patterns, and some clusters of typical read patterns are generated. After that, attribution 1 is given to the cluster of the read patterns corresponding to the current judgment area, and attribution 0 is given to the clusters of the read patterns corresponding to other judgment areas (step S16). Here, the current judgment area refers to the judgment area indicating a gate through which the reference data generation tag group has passed.

The process described above is performed for all the judgment areas, to generate the reference data. That is, after the process of step S16, the higher order server 100 determines whether or not the reference data has been generated for all the judgment areas (step S17), and when there is any judgment area for which the reference data has not been generated (S17:NO), the process returns to step S11, and the processes in step S12-step S16 are performed after changing the target judgment area.

When the reference data is generated for all the judgment areas (S17:YES), the process in the current flowchart is completed. The generated reference data is stored in the storage unit 105 of the higher order server 100, and also transmitted to the reader 200 that covers each judgment area and stored in the storage unit 204 of the reader 200.

FIGS. 7A and 7B are a schematic diagram presenting an example of the reference data. The example presented in FIGS. 7A and 7B illustrates an example of the reference data stored in the storage unit 204 of the reader 200 that covers the judgment area A1 and the judgment area A2. It is assumed that, as the reference data for the judgment area A1, <C1_1, 1> and <C1_2, 1> are stored, and as the reference data for the judgment area A2, <C2_1, 1> and <C2_2, 1> are stored.

Here, C1_1, C1_2 are clusters read in the judgment area A1 when the IC tag 10 passes the judgment area A1, to which the attribution 1 is given. While C2_1, C2_2 are clusters read in the judgment area A2, since C2_2 is a cluster read when the IC tag 10 passes the judgment area A1, the attribution 0 is given. Since S2_1 is the cluster read when the IC tag 10 passes the judgment area A2, to which the attribution 1 is given.

The typical example of each cluster is presented for reference. As described above, the blank indicates that there was no reading of the IC tag 10, and A, B, C are symbols identifying the antenna ANT. C1_1 (typical example) and C1_2 (typical example) represent the read pattern read by the same reader in the same judgment area.

C1_1 (typical example) represents the read pattern read by the antenna identified by the symbol A (antenna ANT1) at the first, third, fifth read timing. In addition, C1_2 (typical example) represents the read pattern read by the antenna identified by the symbol B (antenna ANT2) at the second, fourth, sixth read timing. The same applies to C2_1 (typical example) and C2_2 (typical example).

Meanwhile, the reference data is not limited to the four pieces presented in FIGS. 7A and 7B.

Next, the procedure of the process to judge the degree of similarity between the read pattern read during operation and the reference data is explained. In embodiment 1, the judgment of the degree of similarity during operation is done by each reader 200.

FIG. 8 is a flowchart presenting the process procedure of the degree of similarity judgment process during operation. The reading control unit 211 of the reader 200 receives a reading start instruction from the higher order server 100 for example, and according to the reading control setting stored in the storage unit 204, repeats the search (inventory) process in each judgment area by sequentially using the antenna ANT connected to the reader 200.

Meanwhile, the configuration may also be made so that the passage of an item or human is detected using the sensor 250, and a start trigger of the search process is given. In this case, the input process of the reading start instruction from the higher order server 100 may be omitted.

The reader 200 executes the search process in the same procedure as the generation of the reference data, and waits for the reception of the response from the IC tag 10 by the antenna ANT placed in the judgment area (step S21).

The degree of similarity judgment unit 212 of the reader 200 determines whether a tag read report reported from the reading control unit 211 has been received or not (step S22), and when the tag read report has not been received (S22:NO), the process returns to step S21.

When the degree of similarity judgment unit 212 receives the tag read report from the reading control unit 211 (S22: YES), the following process is performed. However, in the present embodiment, the reading control unit 211 of the reader 200 is supposed to be executing the search process continuously using each antenna ANT while the following process is performed in the degree of similarity judgment unit 212.

The degree of similarity judgment unit 212 of the reader 200 has a read pattern table to record the read pattern of the IC tag 10 for each judgment area, and the a degree of similarity table to temporarily record the calculation result of the degree of similarity of the IC tag 10. In the initial state, the read pattern table and the degree of similarity table are both empty.

In addition, the degree of similarity judgment unit 212 uses a parameter N representing the number of tag read reports, and in the initial state, N=0, and every time the report is received, the value of N is incremented by 1.

Furthermore, it is assumed that, as a fixed parameter used by the degree of similarity judgment unit 212, minimum window size for judgment W and a read finish elapsed time U are stored in advance.

The degree of similarity judgment unit 212 increments, when it receives a tag read report for a certain judgment area the value of the number of reports N just by 1 and updates the read pattern table for the judgment area for each tag ID (step S23).

The read report from the reading control unit 211 includes the tag ID of the read IC tag 10, identification information to identify the antenna ANT, and the read time. When it is a newly read IC tag 10, the degree of similarity judgment unit 212 adds a new row in the read pattern table, and records the antenna symbol (a symbol such as "A"-"D") and the read time in the Nth column. When it is an already-read IC tag 10, a row of the corresponding tag ID already exists, and the antenna symbol and the read time are recorded in the Nth column of the row.

In addition, in the row of the tag ID that has already been read but the tag ID is not included in the report content, "_" representing a blank is recorded in the Nth column. When the content of the read report is empty, that is, when the tag ID could not be read at all, in all the rows of the read pattern table, "_" representing a blank is recorded in the Nth column.

After updating the read pattern table, a list of the tag IDs described in the read pattern table (Tid1, . . . , Tidm) is prepared and the value of the counter j is set to 1 (step S24), the following process is started.

First, regarding the tag ID of Tidj, the difference (Ne−N1+1) between the number of reports at the time of the last tag reading Ne and the number of reports at the time of the first tag reading N1 is assumed as Size (Tidj) and compared with the minimum window size W set in advance (step S25). That is, regarding Tidj indicating the j-th tag ID in the tag ID list recoded in the read pattern table, the judgment process based on the minimum window size W is performed.

When Size(Tidj)≥W (S25:YES), whether or not the reading of the IC tag 10 having the tag ID Tidj existed in the current (N-th) read report (step S26).

When it is determined that the reading of the IC tag 10 having the tag ID Tidj existed in the current (N-th) read report (S26:YES), the tag rad pattern of Tidj is extracted for an amount corresponding to the Size (Tidj), and the calculation of the degree of similarity with the cluster being the reference data for the judgment area is performed (step S27). The target judgment area in step S27 is the judgment area stored in the storage unit 204 of the reader 200 that performs the calculation of the degree of similarity. For example, in the calculation of the degree of similarity performed by the reader 200A, it is the judgment area stored in the storage unit 204 of the reader 200A, that is, the judgment area A1 constituted by the antennas ANT1, ANT2, and the judgment area A2 constituted by the antennas ANT3, ANT4.

Thus, when a plurality of judgment areas are set for a single reader 200, the calculation of the degree of similarity is performed for the reference data of the set plurality of judgment areas. Meanwhile, a plurality of judgment areas set for a single reader 200 means that the antenna ANT connected to a single reader 200 is placed at a plurality of gates.

In step S27, the calculation of the degree of similarity between each cluster and the read pattern is performed while shifting in the time axis direction, the maximum degree of similarity is calculated for each cluster, and the calculated maximum degree of similarity is stored in the degree of similarity table while associating it with the cluster (step S28). In the case that a certain reader 200 has clusters C1-Cp with attribution corresponding to the registered judgment area, when the reader 200 read a plurality of tag IDs (Tid1-Tidm), the degree of similarity table becomes a matrix having the tag IDs (Tid1-Tidm) in the rows and the clusters C1-Cp in the columns. In step S28, the degree of similarity calculated at the intersection specified by the tag ID and the cluster of the degree of similarity table is recorded.

There are several methods for calculating the degree of similarity. For example, a similar method to the algorithm used when generating the reference data may be used. For example, the character string of the read pattern (the character string such as "A", "B", "_" etc.) are compared with the character string of the cluster of the reference data, and 0 is added when both are "_" or one of them is "_", 1 is added when they are the same characters other than "_" (when both are "A", when both are "B"), and −1 (minus 1) is added when they are different characters other than "_", and the number obtained by dividing the obtained integer value by the Size (Tidj) may be the degree of similarity. FIGS. 9A and 9B are a schematic diagram presenting an example of the degree of similarity table.

In addition, when the reference data is an weighted pattern, the degree of similarity may be calculated while adding a weight w where 0≤w≤1.

After the calculation of the degree of similarity, value of the counter j is incremented just by 1 (step S29), and whether or not j>m is determined (step S30). That is, whether or not the calculation of the degree of similarity has been performed for all the IC tags 10 included in the tag ID list of the read pattern table is determined. When j≤m, that is, any tag ID of the IC tag 10 for which the calculation of the degree of similarity has not been performed is included in the tag ID list (S30:NO), the process returns to step S25, and the calculation of the degree of similarity is continued.

When j>m, that is, the calculation of the degree of similarity has been performed for all the IC tags 10 included in the tag ID list (S30:Yes), the process returns to step S21, to wait for the next read report.

When Size (Tidj)<W in step S25 (S25:NO), it is determined that data required for similarity judgment has not been collected yet.

Then, to judge whether or not the completion of the reading of Tidj should be determined, whether or not the difference Unread(Tidj) between the latest read time and the read time at which the tag ID of Tidj was last read exceeds the read finish elapsed time U is determined (step S31). Here, the latest read time refers to the time at which the reader 200 performed the latest tag reading in its judgment area. Since Tidj is not necessarily read in the latest reading, the difference with the time at which Tidj was last read is obtained.

When Unread (Tidj)>U, that is, the tag reading of Tidj has not been over the read finish elapsed time U (S31:YES), it is judged that the reading is finished determining that the IC tag 10 having the tag ID Tidj is already outside the reading area of the gate, and the data of Tidj is deleted from the read pattern table and the degree of similarity table (step S32).

When the data of Tidj is deleted, or when Unread (Tidj)) (S31, NO), the process after step S29 is performed.

When it is determined that there was no reading of the IC tag 10 having the tag ID Tidj (S26:NO), in the same manner as the process in step S31, whether or not Unread(Tidj)>U is determined (Step S33).

When Unread(Tidj)>U, that is, when the tag reading Tidj has not been over the read finish elapsed time U (S33:YES), it is determined that the tag reading of Tidj is finished. In this case, the reader 200 performs the degree of similarity report process to the higher order server 100 (step S34), and after that, deletes the data of Tidj from the read pattern table, the degree of similarity table (S32), and performs the process after step S29.

When Unread (Tidj)≤U (S33:NO), the process after step S29 is performed.

The degree of similarity report process in step S34 is performed as follows. Assuming the judgment area by the reader 200 as the judgment area Ak, from the degree of similarity table of the judgment area Ak, among the degree of similarity of Tidj, the degree of similarity $\sigma 1$ of the cluster C1 having the maximum degree of similarity in the clusters having attribution 1, and if there are any clusters having attribution 0, the degree of similarity $\sigma 0$ of the cluster C0 having the maximum degree of similarity among them are selected, and report data including Tidj, Ak, $\sigma 1$, $\sigma 0$ is generated. The reader 200 performs the degree of similarity report by transmitting the generated report data to the higher order server 100. Here, Ak is identification information to identify the judgment area Ak.

Meanwhile, date information indicating the time of the detection of the IC tag 10 and the like may be added to the report data. The report data may be transmitted in a single message for each tag ID, or may be transmitted in a message of the list format of records having items Tidj, Ak, $\sigma 1$, $\sigma$ for a plurality of tag IDs.

Next, the process at the higher order server side is explained. The higher order server 100 performs the process to determine the judgment area through which the IC tag 10 passed, based on the reference data generated in advance, when it receives the degree of similarity report from the reader 200.

FIG. 10 is a flowchart illustrating a process procedure of a judgment area determination process. When determining the judgment area through which each IC tag 10 passed, the higher order server 100 prepares a judgment table in the RAM 103 or the storage unit 105 as a table to record the judgment result. In this judgment table, report data of the degree of similarity report transmitted from the reader 200 is recorded. Its initial value is empty. Meanwhile, in the following explanation, the report data for the judgment area AK, the IC tag 10 having the tag ID Tidj is described as Rj=(Tidj, Ak, $\sigma 1$, $\sigma 0$).

The higher order server 100 first sets the value of both the counters j, k to 1 (step S41). Then, the higher order server 100 reads report data R1, . . . , Rnk of the degree of similarity report for the judgment area Ak (step S42). Here, nk is the number of IC tags 10 read in the judgment area Ak. When the number of IC tags 10 read in the judgment area Ak is nk, nk pieces of the report data for the judgment area Ak also exists.

Next, the higher order server 100 extracts report data Rj in which the tag ID (Tidj) of one IC tag 10 to be the judgment target is recorded, from the read report data R1, . . . , Rnk (step S43).

The higher order server 100 determines whether or not the report data Rj of the IC tag 10 having Tidj as tag ID already exists in the judgment table (step S44). When the report data Rj does not exist in the judgment table (S44:NO), the report data is recorded in the judgment table (step S45).

Next, the higher order server 100 increments the value of the counter j just by 1 (step S46) and after that, determines whether or not j>nk (step S47). If j>nk is not satisfied (S47:NO), the higher order server 100 returns the process to step S43. That is, the higher order server 100 records, while changing the value of the counter j from 1 to nk, each report data in the judgment table.

Meanwhile, when j>nk is satisfied (S47:YES), the higher order server 100 increments the value of the counter k just by 1 (step S48), determines whether or not k>m is satisfied (step S49). When k>m is not satisfied (S49:NO), that is, when another judgment area for which comparison has not been performed exists, the process returns to step S42.

When k>m is satisfied (S49:YES), the comparison has been done for all the judgment areas, and the process in the current flowchart is terminated.

In step S44, when it is determined that the report data Rj of the IC tag 10 having Tidj as the tag ID already exists in the judgment table (S44:YES), the existing report data Rj=(Tidj, Ak, $\sigma 1$, $\sigma 0$) recorded in the judgment table is rewritten to Rj'=(Tidj, Ak, $\sigma 1'$, $\sigma 0'$) (step S50), and after that, whether or not $E(\sigma 1', \sigma 0')<E(\sigma 1, \sigma 0)$ is satisfied is determined (step S51). There, E is an evaluation function, which may be expressed, for example, as $E(\sigma 1', \sigma 0')=a\times\sigma 1-b\times\sigma 0$, where a, b, are weighting coefficients of positive real numbers.

The evaluation function E indicates that, the larger the value of the degree of similarity $\sigma 1$ (or $\sigma 1'$) with the cluster of the read pattern detected at the gate upon passage through the gate, the higher the possibility that the IC tag 10 passed the judgment area related to the degree of similarity $\sigma 1$ (or $\sigma 1'$). Meanwhile, it indicates that, the larger the value of the degree of similarity $\sigma 0$ (or $\sigma 0'$) with the cluster of the read pattern detected at the gate upon passage through another gate, the lower the possibility that the IC tag 10 passed the judgment area related to the degree of similarity $\sigma 0$ (or $\sigma 0'$).

That is, by the evaluation function E, the probability of the degree of similarity report is evaluated by the magnitude relationship between of the degree of similarity $\sigma 1$ (or $\sigma 1'$) and the degree of similarity $\sigma 0$ (or $\sigma 0'$).

The weighting coefficients a, b used in the evaluation function E may be changed as needed, and also may be omitted. For example, by using values that realizes a<b relationship, the degree of similarity $\sigma 0$ may be evaluated more strongly. Meanwhile, the values of a, b and the format of the evaluation function itself are not limited to this, and appropriate coefficients and evaluation function may be selected according to the operation form.

In step S51, when it is determined that $E(\sigma 1', \sigma 0')<E(\sigma 1, \sigma 0)$ is not satisfied (S51:NO), the higher order server 100 performs the process after step S46.

Meanwhile, in step S51, when it is determined that, $E(\sigma 1',\sigma 0')<E(\sigma 1, \sigma 0)$ is satisfied (S51:YES), the data of the judgment table is updated to Rj=(Tidj, Ak, $\sigma 1$, $\sigma 0$) (step S52). That is, for each of the Rj extracted in step S43 and the Rj recorded in the judgment table, after calculating the value of the evaluation function E, the values of the evaluation functions E are compared, and the degree of similarity report with the larger value of the evaluation function E is adopted.

After step S52, the higher order server 100 performs the process after step S47.

By repeating the process described above, the content of the judgment table obtained eventually represents the desirable judgment result (the judgment area with a high probability that each IC tag 10 passed).

Meanwhile, while the present embodiment is configured so that the higher order server 100 performs the judgment area determination process described above when it receives the degree of similarity report from the reader 200, the judgment area determination process may be repeated at a predetermined time interval counted by the higher order server 100.

According to the present embodiment, in a particular IC tag 10, when the cluster of the attribute 1 is dominant in a plurality of judgment areas, that is, when the judgment results of the degree of similarity for each reader 200 contradict, the final judgment with a high probability may be made at the higher order server 100.

At this time, by not using simple comparison of the maximum degree of similarity between the judgment areas but using the calculation result of the degree of similarity with the cluster of the attribution 0, making an erroneous final judgment by comparison of the degree of similarity between the judgment areas that are originally not comparable may be excluded.

In addition, since the calculation of the degree of similarity to be the basis of the final judgment is performed for each reader 200 and each judgment area, even if some readers 200 are having problem or stopped, as long as the passed judgment area is operating normally, the final decision may be made with no problem.

Embodiment 2

In embodiment 1, the system configuration is made so that reader 200 side performs up to the degree of similarity judgment process, but the configuration may also be made so that the higher order server 100 side performs processes including the degree of similarity judgment process.

In embodiment 2, the configuration in which, based on the detection result of the IC tag 10 obtained via each reader 200, the higher order server 100 performs the degree of similarity judgment process, the determination process of the judgment area is explained.

Figure 11:
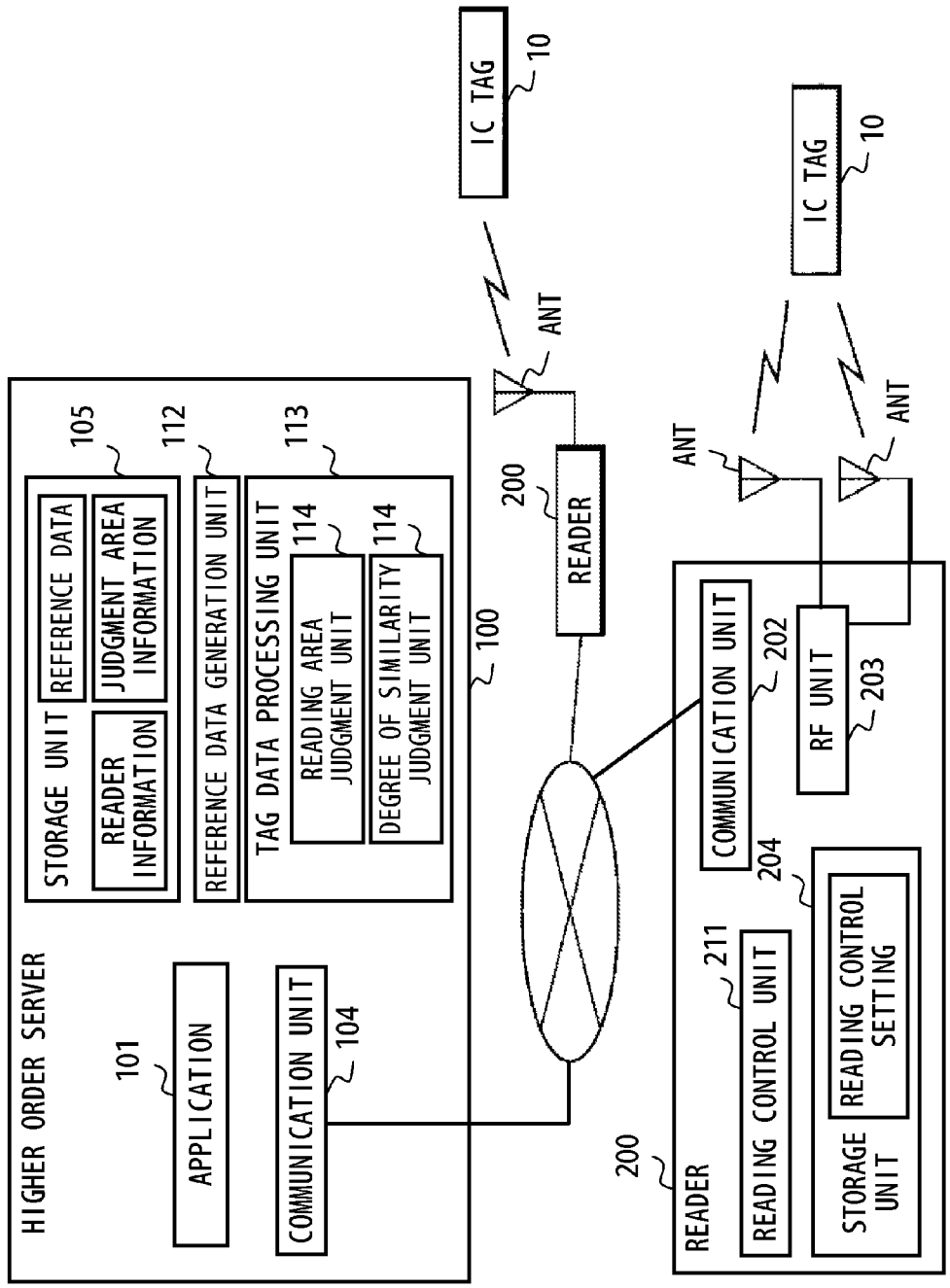
FIG. 11 is a block diagram illustrating the functional configuration of a higher order server and a reader according to embodiment 2.

FIG. 11 is a block diagram illustrating the functional configuration of the higher order server 100 and the reader 200 according to embodiment 2. The reader 200 operates autonomously according to the reading control setting, and reads the IC tag 10. The reading control unit 211 loads the content of the reading control setting from the storage unit 204, and according to the described control procedure, controls the RF unit 203 corresponding to each antenna ANT to transmit the search (inventory) command of the IC tag, and reads the response from the IC tag 10.

In the present embodiment, the read information of the tag ID is transmitted to the higher order server 100 via the communication unit 202.

The tag data processing unit 113 of the higher order server 100 includes the degree of similarity judgment unit 115 that compares data of the tag ID from the reader 200 received via the communication unit 104 and the reference data accumulated in advance for each tag ID in the same manner as in embodiment 1. Meanwhile, the process details executed by the degree of similarity judgment unit 115 are exactly the same as the process details of the degree of similarity judgment unit 212 that the reader 200 in embodiment 1 includes.

The reading area judgment unit 114 determines the final reading area from the judgment area based on the calculation result of the degree of similarity between the data of the tag ID and the like transmitted from the reader 200 and the reference data. As the determination method of the judgment area, the method presented in the flowchart in FIG. 10 may be used.

In embodiment 2, the configuration of the reader placed on the site may be simplified, and the flexibility of placement on the site is improved.

Meanwhile, the wireless reading of the IC tag 10 may deteriorate temporarily due to environmental change and the like, and the judgment accuracy may be increased by disregarding the temporary failure in reading the IC tag 10. In this case, the system may be made so that a smoothing parameter s is prepared, and the temporary failure in reading for a number given by the smoothing parameter s or below are processed as successfully read.

Such a system is effective in a case where each judgment area includes only one antenna.

In addition, since the strength of the antenna output affects the tag reading, by providing the reader with the antenna output control unit, the tag search may be performed while repeatedly switching the two stages of antenna strength intentionally.

By performing the tag reading while repeating output levels having an appropriate level difference, two moving bodies moving in the judgment areas with different distances from the antenna may be distinguished with a better accuracy.

According to some embodiments, it becomes possible to judge, based not only on the similarity with reference data set for an area in which detection should occur originally (first area) but also on the degree of similarity if reference data set for an area in which detection should not occur (second area), whether or not the detection target passed the first area, to exclude wrong judgment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A judgment apparatus comprising:
   a storage configured to store first reference data representing data that a radio frequency identification (RFID) reader outputs in a first area when a detection target to which an RFID tag is attached passed the first area, and second reference data representing data that the RFID reader outputs in the first area when the detection target passed a second area that is adjacent to the first area; and
   a processor to perform processes of:
   obtaining data from the RFID reader outputting, in a time-series manner, data according to a detection condition of the detection target passing the first area or the second area;
   judging a degree of similarity between data obtained by the obtaining and the first reference data and the second reference data stored in the storage; and
   judging whether or not the detection target passed the first area, based on a result of the judging of the degree of similarity.

2. The judgment apparatus according to claim 1, the processes comprising:
calculating a probability that the detection target passed the first area, based on the judgment result,
wherein the calculating is configured to calculate the probability higher when the degree of similarity between the data and the first reference data is higher, and to calculate the probability lower when the degree of similarity between the data and the second reference data is higher; and
the judging whether or not the detection target passed the first area is configured to perform judgment according to the probability calculated by the calculating.

3. The judgment apparatus according to claim 1, wherein the judging whether or not the detection target passed the first area is configured to make a judgment that the detection target passed the first area, when the probability calculated from the degree of similarity between the data and the first reference data and the degree of similarity between the data and the second reference data is higher than the probability calculated from the degree of similarity between the data and the first and second reference data stored in a similar manner in the second area.

4. A judgment system comprising:
a RFID reader configured to output, in a time-series manner, data according to a detection condition of a detection target to which an RFID tag is attached passing a first area or a second area that is adjacent to the first area;
a storage configured to store first reference data representing data that the RFID reader outputs in the first area when the detection target passed the first area, and second reference data representing data that the RFID reader outputs in the first area when the detection target passed the second area;
a processor to perform processes of:
obtaining data that the RFID reader outputs;
judging a degree of similarity between data obtained by the obtaining and the first and second reference data stored in the storage; and
judging whether or not the detection target passed the first area, based on a result of the judging of the degree of similarity.

5. The judgment system according to claim 4, the processes comprising:
calculating a probability that the detection target passed the first area, based on the judgment result,
wherein
the calculating is configured to calculate the probability higher when the degree of similarity between the data and the first reference data is higher, and to calculate the probability lower when the degree of similarity between the data and the second reference data is higher; and
the judging whether or not the detection target passed the first area is configured to perform judgment according to the probability calculated by the calculating.

6. The judgment system according to claim 4, wherein
the judging whether or not the detection target passed the first area is configured to make a judgment that the detection target passed the first area, when the probability calculated from the degree of similarity between the data and the first reference data and the degree of similarity between the data and the second reference data is higher than the probability calculated from the degree of similarity between the data and the first and second reference data stored in a similar manner in the second area.

7. A judgment method, comprising:
storing, in a storage, first reference data representing data that a RFID reader outputs in a first area when a detection target to which an RFID tag is attached passed the first area, and second reference data representing data that the RFID reader outputs in the first area when the detection target passed a second area that is adjacent to the first area;
obtaining, by a processor, data from the RFID reader outputting, in a time-series manner, the data according to a detection condition of the detection target passing the first area or the second area;
calculating, by the processor, a degree of similarity between the data obtained and the first reference data representing data that the RFID reader outputs when the detection target passed the first area stored in the storage, and a degree of similarity between the data and the second reference data representing the data that the RFID reader when the detection target passed the second area stored in the storage; and
making, by the processor, a judgment that the detection target passed the first area, when the degree of similarity between the data and the first reference data is higher than the degree of similarity between the data and the second reference data.

8. A non-transitory computer-readable recording medium having stored therein a program for causing a computer to execute a process, the process comprising:
storing, in a storage, first reference data representing data that a RFID reader outputs in a first area when a detection target to which an RFID tag is attached passed the first area, and second reference data representing data that the RFID reader outputs in the first area when the detection target passed a second area that is adjacent to the first area;
judging a degree of similarity between data obtained from the RFID reader outputting data according to a detection condition of the detection target in a time-series manner and the first reference data representing data that the RFID reader outputs when the detection target passed the first area stored in the storage, and the degree of similarity between the data and the second reference data representing data that the RFID reader outputs when the detection target passed the second area stored in the storage; and
judging whether or not the detection target passed the first area, based on a result of the judging.

* * * * *